United States Patent [19]
Molins et al.

[11] 3,941,036
[45] Mar. 2, 1976

[54] CONTINUOUS FILTER ROD MAKING MACHINES

[75] Inventors: Desmond Walter Molins, London, England; Francis Auguste Maurice Labbe, Neuilly-sur-Seine, France

[73] Assignee: Molins Limited, England

[22] Filed: Apr. 5, 1974

[21] Appl. No.: 458,440

Related U.S. Application Data

[63] Continuation-in-part of Ser. No. 319,615, Dec. 29, 1972, abandoned.

[30] Foreign Application Priority Data
Jan. 7, 1972 United Kingdom.................. 891/72
Feb. 11, 1972 United Kingdom................ 6614/72

[52] U.S. Cl................ 93/1 C; 131/84 A; 131/84 B
[51] Int. Cl.²........................................... A24C 5/50
[58] Field of Search............... 93/1 C, 77 FT, 77 R; 131/84 B, 84 A

[56] References Cited
UNITED STATES PATENTS

| | | | |
|---|---|---|---|
| 2,221,443 | 11/1940 | Davidson | 93/1 C |
| 2,351,410 | 6/1944 | DiIanni | 131/84 A |
| 3,494,263 | 2/1970 | Tachibana et al. | 93/1 C |
| 3,548,837 | 12/1970 | Cristiani | 131/84 B |
| 3,563,249 | 2/1971 | Geyer et al. | 131/84 B |
| 3,587,593 | 6/1971 | Wilde et al. | 131/84 B |
| 3,589,373 | 6/1971 | Hooper | 131/84 B X |
| 3,675,541 | 7/1972 | Tokitomo et al. | 93/1 C |
| 3,736,941 | 6/1973 | Molins et al. | 131/84 B X |
| 3,779,252 | 12/1973 | Brackmann et al. | 131/84 B |

FOREIGN PATENTS OR APPLICATIONS
1,269,974   4/1972   United Kingdom

*Primary Examiner*—James F. Coan
*Attorney, Agent, or Firm*—Craig & Antonelli

[57] ABSTRACT

A filler for a continuous cigarette filter rod is formed by feeding a wide band of filaments of filter material on to a slower moving surface, to which suction is applied so that the band is axially shrunk and the filaments crimped. The band is then narrowed to the desired width of the filler whilst retaining the crimp in the filaments, preferably by the use of a plasticiser.

19 Claims, 8 Drawing Figures

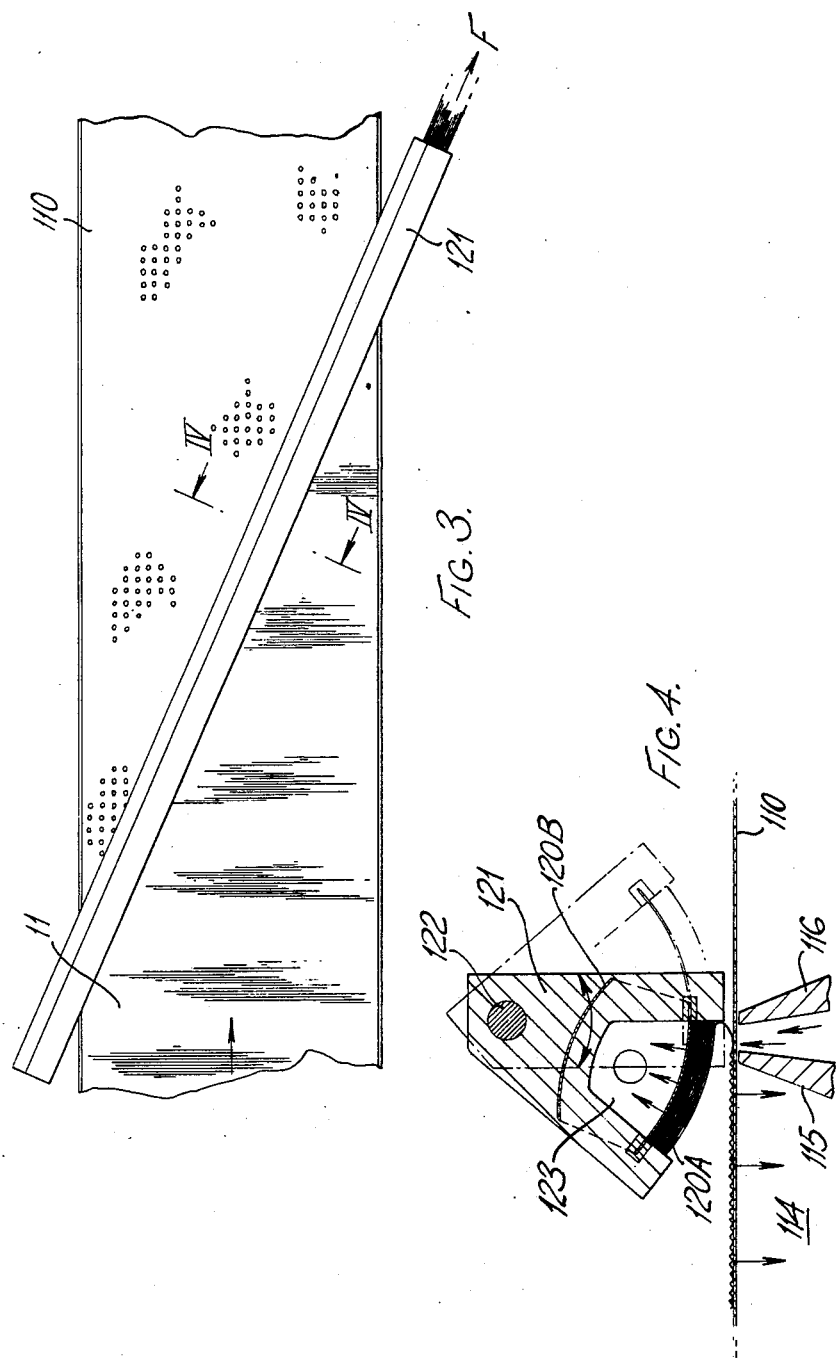

CONTINUOUS FILTER ROD MAKING MACHINES

This application is a continuation-in-part of our copending application Ser. No. 319615 filed Dec. 29, 1972 and now abandoned.

This invention relates to continuous cigarette filter rod making machines.

In such machines filter material in the form of a band or tow consisting of a bundle of crimped filaments of material, such as cellulose acetate, is fed on to a continuous wrapper which is carried through a garniture by means of a garniture tape. In the garniture the wrapper is folded around the filter material and has its edges overlapped and sealed together to form a continuous filter rod which is severed into lengths of filter rod of multiples of the length of a filter to be combined with a cigarette to form a filter cigarette. Before being carried into the folding mechanism the tow passes through a tongue where it is laterally compressed.

One of the difficulties with the making of a continuous filter rod is to have the filter rod tightly enough packed with the tow material i.e. in relation to a given cross-sectional area of rod to have the mass per unit length as high as is desirable.

According to the present invention there is provided a method of forming a filler for a continuous cigarette filter rod comprising the steps of feeding a wide band of filaments of filter material on to a moving surface to which suction is applied, the suction surface moving in the direction of movement of the band but at a lower speed than the speed at which the band is fed so that the band is axially shrunk to crimp the filaments and the axially shrunken band is held to the suction surface, and then narrowing the band to form a filler whilst retaining the crimp in the filaments produced by the axial shrinking.

The crimps in the filament may be set by applying thereto a plasticiser to soften the filaments, and then heating the plasticised band to set the filaments in a crimped condition.

Further according to the invention there is provided apparatus for forming a filler for a continuous cigarette filter rod comprising a first movable surface having means for applying suction thereof, means for feeding a wide band of filaments of filter material on to the surface at a speed greater than the speed of movement of the surface so that the band is axially shrunk to crimp the filaments, and means to narrow the band to the desired width of the filler whilst retaining the crimp in the filaments produced by the axial shrinking.

The apparatus may further comprise a second surface closely spaced from the first surface to produce therebetween a wide shallow gap into which the band is fed.

The two surfaces are preferably first and second drums rotatable in opposite senses so that their adjacent surfaces move in the same direction at a peripheral speed less than the speed at which the band is fed to the gap between the drums, the first drum having a blanking member to cut off suction so that after passing through the gap the band is transferred to the second drum.

By a wide band is meant that the width of the band is appreciably greater than the thickness of the band. For example, the width of the band and the gap may be 250 mm and the thickness of the band and the corresponding dimension of the gap may be 2 mm.

Three embodiments of the invention will now be described, by way of example, with reference to the accompanying diagrammatic drawings of which:

FIG. 3 is a plan view of a second embodiment of the invention,

FIG. 4 is a section on the line IV—IV of FIG. 3,

Figure 1:
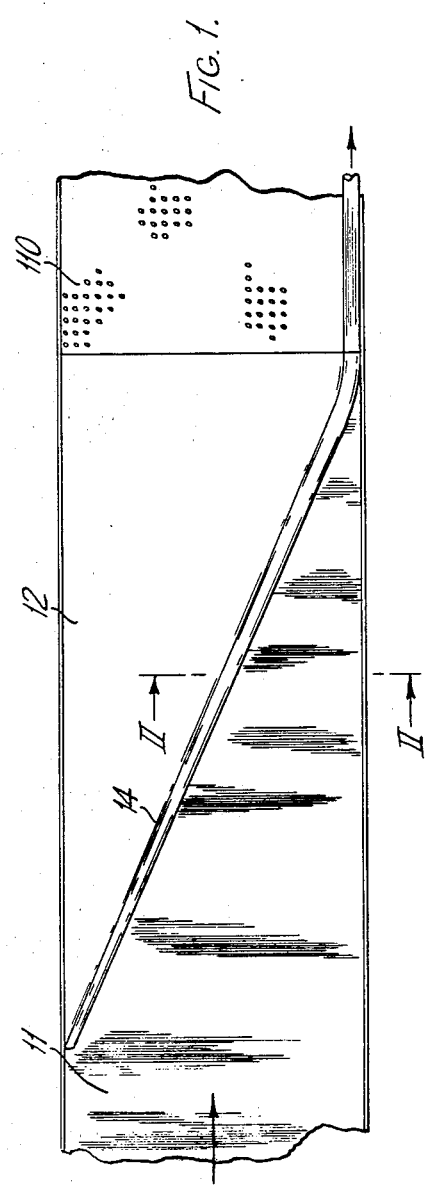
FIG. 1 is a plan view of a first embodiment of the invention.
Figure 2:
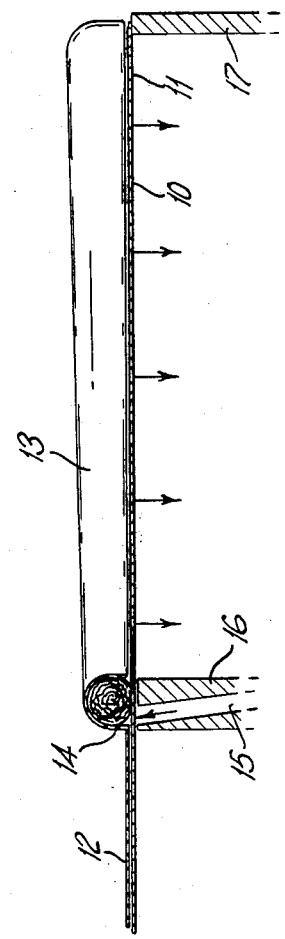
FIG. 2 is a section on the line II—II of FIG. 1.

In FIGS. 1 and 2 the upper run of a perforated conveyor 110 is shown, suction being applied to the underside of the conveyor, which travels in the direction shown by the arrow in FIG. 1, by a suction chamber having walls 16 and 17. A wide band 11 of filaments of filter material such as cellulose acetate is fed on to the left hand end of the conveyor 110 in the direction shown by the arrow, and at a faster speed than the conveyor, so that the individual filaments or fibres become crimped and are held to the conveyor 110 in this crimped condition. A cover plate 12 fits closely against the conveyor, and at its upstream edge is turned over to produce a part-conical deflector or tunnel 13 in which the filler is to be formed. As the crimped filaments meet the wall 14 of the tunnel 13 they move clockwise as shown in FIG. 2 around the tunnel. The filaments proceed along the line of the wall 14 from its smaller end at the top of FIG. 1 and left hand side of FIG. 2 to its larger end, turning clockwise all the time. As they proceed along the tunnel 14 they are progressively enveloped by further layers of the crimped filaments meeting the wall 14. As shown in FIG. 2, the suction chamber ends at the wall 16 at the edge of the tunnel 13, and to assist in the rolling action to form the filler a duct 15 tangential to the tunnel 13 is formed in the wall 16 so as to strip the crimped filaments from the suction conveyor 110 and turn them in the clockwise direction. At the larger diameter end of the tunnel 13 the complete filler is formed and then is held to the suction conveyor 110 and led away axially to be fed into the tongue of the rod forming machine.

In the embodiment of FIGS. 3 and 4 the wide band of filaments of filter material is again fed to a similar suction conveyor 110 at a faster speed so that the filaments are crimped, and the filler is again formed by collecting the filaments diagonally across the suction conveyor 110. In this embodiment a second endless suction conveyor, which has a lower run 120A and a return run 120B, is carried in a member 121 substantially in the shape of an inverted V which is oscillated transversely about a spindle 122. The lower run 120A travels in the direction of the arrow F in FIG. 3. Above the lower run 120A of the conveyor is provided a suction chamber 123 which communicates with a source of suction in a manner not shown. Below the conveyor 110 a suction chamber 114 which applies suction to the conveyor terminates at an end wall 115 which is in line with the member 121. A vertical air duct is formed between the wall 115 and a further wall 116 to receive a flow of air which it directs vertically through the conveyor 110. As the member 121 oscillates about a spindle 122 between the position shown in full lines in FIG. 4 to that shown chain dotted, and the lower run 120A of the conveyor travels from the top left of FIG. 3 to the bottom right, the crimped filaments on the conveyor 110 are transferred by the air flow through the duct 116 on to the underside of the run 120A.

Figure 5:
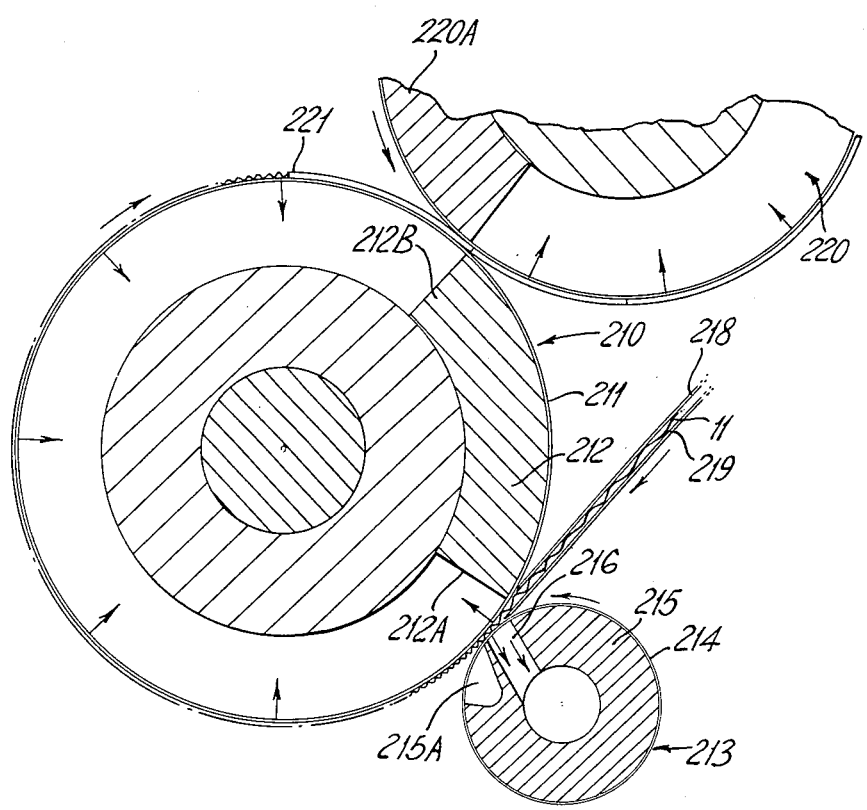
FIG. 5 is a side sectional elevation of a third embodiment of the invention.

In the third embodiment of the invention which is shown in FIG. 5, there are provided two suction drums 210 and 213. The drum 210 comprises a perforated cylindrical periphery 211 which travels in the direction shown by the arrow about a blanking member 212. The blanking member terminates at a surface 212A so that at this point suction is applied to the periphery 211 of the drum. The drum 213 is closely spaced from the drum 210 and consists of a perforated cylindrical periphery 214 which travels in the direction shown by the arrow about a blanking member 215. Suction is applied through the centre of the drum to a generally radial passage 216 in the blanking member 215 so that suction is applied to the periphery 214 of the drum over the circumferential extent of this passage. The two drums rotate at the same peripheral speed so that the adjacent surfaces of their peripheries 211 and 214 move in the same direction.

A filter tow in the form of a wide band 11 of filaments is fed to the gap between the two drums through a passageway having smooth upper and lower walls 218 and 219 respectively closed by side walls (not shown). The width of the drums, and thus of the band 11, is approximately 250 mm, and the gap between the two drums, and thus the thickness of the band 11, is approximately 2 mm. The band 11 is already crimped as it advances towards the gap, and the effect of suction from the drums 210 and 213 is to draw the band through the passageway at a greater speed than the peripheral speed of the drums, so that in the gap between the drums the band 11 is axially shrunk or concertinaed to increase the crimping. As the band leaves the gap it is retained in this more highly crimped form against the periphery 211 of the suction drum 210 due to the suction being cut off from the periphery 214 of the drum 213. In the blanking member 215 there is a cut out portion 215A to enable air to be drawn out through the periphery 214 through the crimped band 11 and into the drum 210, in order to prevent any filaments remaining attached to the periphery 214.

The crimped band is held to the periphery 211 of the drum 210 for aboug three-quarters of its circumferential extent until suction is cut off by the wall 212B of the blanking member 212. Between the walls 212A and 212B the crimped band is held tightly against the drum 210 and plasticising liquid is applied to the band to soften the filaments, by means not shown; a suitably fast acting plasticising liquid for this purpose is TEGMEE (triethylene glycol methyl ethyl ether). The plasticised band is then heated to evaporate the plasticiser so that when the crimped band is approaching the wall 212B the crimps are substantially set. At the wall 212B the band is transferred to a further suction drum 220 which is narrower than the drum 210 and which contains a blanking member 220A. Just before, during and after the transfer the band is conveyed between a pair of baffles 221 which converge in the direction of travel of the band, so that the wide band with its crimps set therein is converted to substantially the shape of the final filler to be fed into the garniture tongue of the rod forming machine.

Figure 6:
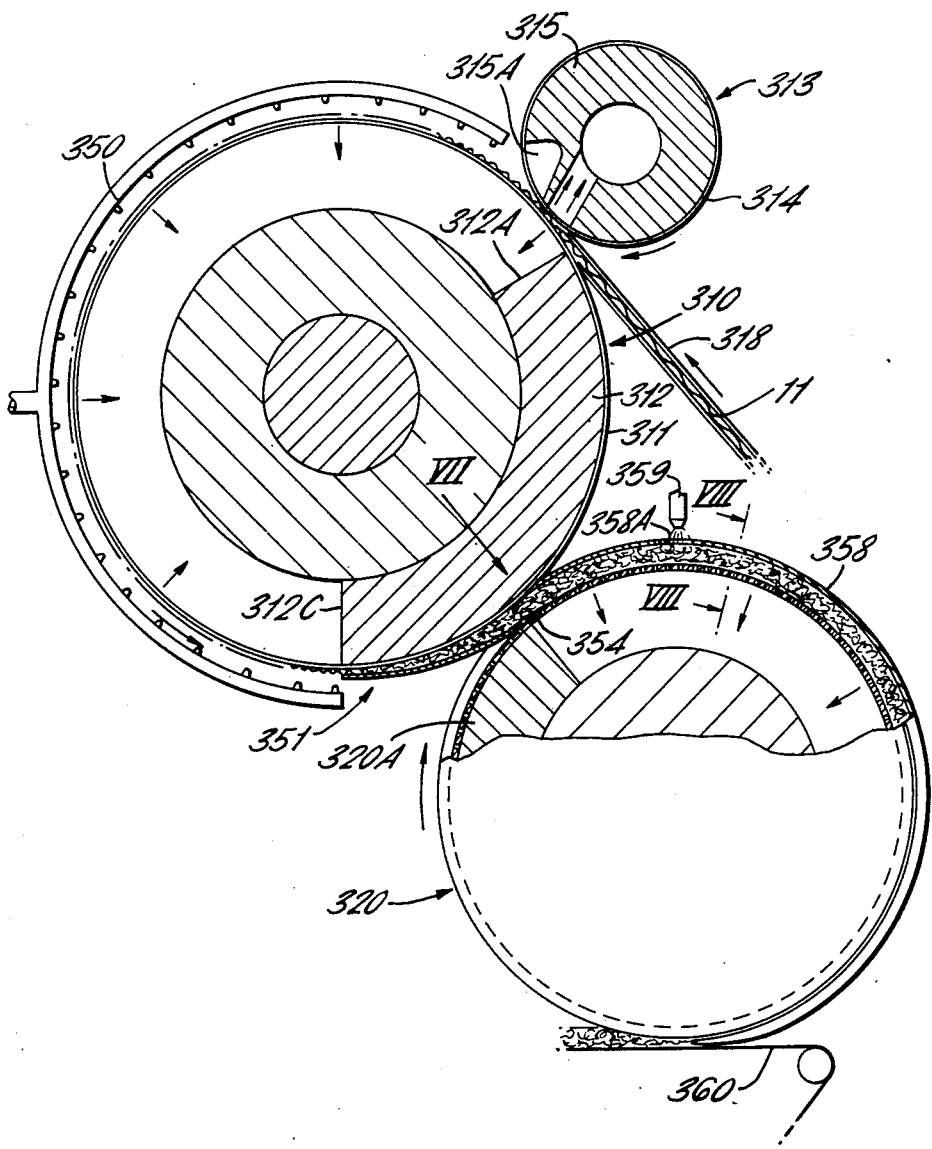
FIG. 6 is a modification of the third embodiment.

The apparatus shown in FIG. 6 is similar to that of FIG. 5, except that it is inverted and shows additional parts of the apparatus. Similar parts are therefore designated by the corresponding references of FIG. 5 increased by 100 (with the exception of the band of filter filaments for which the same reference numeral 11 is retained).

The wide band 11 is again drawn by suction through the walls 318 and 319 of the passageway, as described above, but in this case a plasticiser, for example TEGDA (triethylene glycol diacetate), is applied to the band in the filter tow unit (not shown) upstream of the passageway.

When the crimped band is released from the periphery 314 of the drum 313 it is subjected to streams of hot air from the nozzles of a manifold 350 disposed about the perforated periphery 311 of the drum 310, which cause the crimps in the plasticised band to be set.

The band 11 now enters a fixed convergent baffle 351, and at the same time suction is cut off from the drum 310 by a wall 312C of the blanking member 312.

Figure 7:
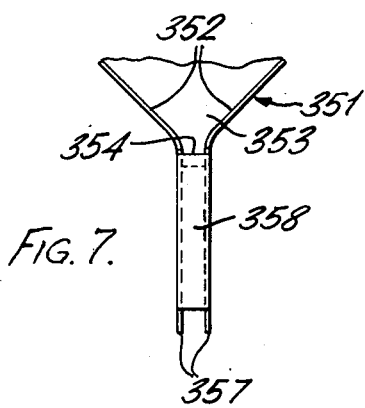
FIG. 7 is a view in the direction of arrow VII of a part of FIG. 6.

Referring now also to FIG. 7, which shows the baffle 351 as viewed in the direction of arrow VII with the drum 310 removed, it will seem that the side walls 352 of the baffle are sharply convergent in the direction of movement of the band. The side walls 352 are connected by an outer wall 353 which changes from an initially rectangular section to a semi-circular section at the throat 354 of the baffle. The outer wall 353 constrains the band 11 radially, (since it is not now held to the drum 310 by suction) but allows its thickness to increase to approximately 8 mm at the throat.

Figure 8:
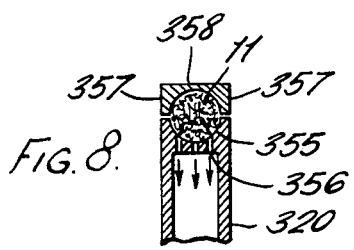
FIG. 8 is a section on the line VIII—VIII of FIG. 6, but drawn to a larger scale.

The band is then transferred to the narrow drum 320, which has a semi-circular groove 355 in its periphery, as can be seen in FIG. 8. The trailing edge of the outer wall 353 at the throat 354 extends partly into the groove 355, to which suction is applied through bores 356 to hold the band in the groove.

Mounted stationary at each side of the groove around the periphery thereof are side guides 357 enclosed by an outer guide 358. The guide 358 is shaped internally to change the section of the upper part of the band coming off the periphery 311 of the drum 310 from rectangular to semi-circular section, so that before reaching an opening 358A in the guide 358 the whole band 11 becomes approximately circular in section, as shown in FIG. 8. At the opening 358A a nozzle 359 directs a stream of acetone (or other detone solvent, or acetate or ester solvent) into the band 11 to reactivate the plasticiser and allow the springy filaments of the band to reset in their new compacted circular section.

The band 11 continues to be held in the groove and constrained by the guides 357 and 358 until it reaches the garniture tape 360, by which time the solvent has evaporated sufficiently to reset the band. A paper wrapper (not shown) on the tape 360 is then folded around the band, in the conventional manner, to form a continuous filter rod.

Instead of directing a stream of solvent into the band of circular section, the plasticiser therein may be reactivated by reheating the band around the narrow drum 320. Alternatively, further plasticiser may be applied to the band at the opening 358A, instead of solvent.

We claim:
1. A method of forming a filler for a continuous cigarette filter rod comprising the steps of feeding a wide band of filaments of filter material into a wide shallow gap formed by two spaced moving surfaces to each of which suction is applied, the suction surfaces moving at a lower speed than the speed at which the band is fed so that the band is axially shrunk to crimp the filaments and the axially shrunken band is held to the suction surfaces, releasing the shrunken band from one of the surfaces and then narrowing the band to form a filler while retaining the crimp in the filaments produced by the axial shrinking.

2. A method as claimed in claim 1 further comprising the step of setting the crimps in the filament before narrowing the band so that suction can be released from the band without losing the crimping.

3. A method as claimed in claim 2 wherein the setting of crimps in the filaments is carried out by applying to the band a plasticiser to soften the filaments, and heating the plasticised shrunken band to set the filaments in a crimped condition.

4. A method according to claim 3 further comprising the step of reactivating the plasticised band after being narrowed, by the application of a solvent thereto.

5. A method of forming a filler for a continuous cigarette filter rod comprising the steps of feeding a wide band of filaments of filter material on to a moving surface to which suction is applied, the suction surface moving in the direction of movement of the band but at a lower speed than the speed at which the band is fed so that the band is axially shrunk to crimp the filaments and the axially shrunken band is held to the suction surface, and then narrowing the band to form a filler while retaining the crimp in the filaments produced by the axial shrinking, the band being narrowed by collecting it on a conveyor disposed diagonally across, and travelling generally in the direction of, the suction surface and also having suction applied thereto, and oscillating the conveyor transversely to its direction of travel so that the band is laid alternatively from one side to the other of the conveyor.

6. A method as claimed in claim 5 further comprising the step of supplying air through the suction surface along the line of transfer of the band and in the opposite direction to the suction flow to assist in transferring the band onto the conveyor.

7. A method of forming a filler for a continuous cigarette filter rod comprising the steps of feeding a wide band of filaments of filter material onto a moving surface to which suction is applied, the suction surface moving at a lower speed than the speed at which the band is fed so that the band is axially shrunk to crimp the filaments and the axially shrunken band is held to the suction surface, and then narrowing the band to form a filler while retaining the crimp in the filaments produced by the axial shrinking by directing it against a deflector disposed diagonally across the suction surface to roll the band and form a progressively advancing helical filler, and feeding the filler along the deflector.

8. A method as claimed in claim 7 further comprising the step of supplying air beneath the deflector through the suction surface in the opposite direction to the suction flow so as to assist in rolling the band to form the filler.

9. Apparatus for forming a filler for a continuous cigarette filter rod comprising a first movable surface having means for applying suction thereto, a second movable surface having means for applying suction thereto, the second surface being closely spaced from the first surface to produce therebetween a wide shallow gap, means for feeding a wide band of filaments of filter material into said gap at a speed greater than the speed of movement of the surfaces, so that the band is axially shrunk to crimp the filaments, and means to narrow the band to the desired width of the filler while retaining the crimp in the filaments produced by the axial shrinking.

10. Apparatus as claimed in claim 9 wherein the two surfaces are first and second drums rotatable in opposite senses so that their adjacent surfaces move in the same direction at a peripheral speed less than the speed at which the band is fed to the gap between the drums, the first drum having a blanking member to cut off suction so that after passing through the gap the band is transferred to the second drum.

11. Apparatus as claimed in claim 10 wherein the means to narrow the band whilst retaining the crimping comprises a third rotatable drum to receive the band from the second drum, a convergent baffle positioned between the second and third drums, and means upstream of the baffle to apply plasticiser to the band to set the crimps.

12. Apparatus as claimed in claim 10 wherein the means for feeding a wide band of filaments of filter material comprises a passageway extending to the gap through which the band passes, suction being applied to the downstream end thereof from the suction drums to draw and axially shrink the band in the passageway.

13. Apparatus as claimed in claim 10 wherein the means to narrow the band whilst retaining the crimping comprises successively means to apply plasticiser to the band, heater means downstream of the gap to heat the plasticised band to retain the crimping, and a convergent baffle disposed about a part of the periphery of the second drum to narrow the band.

14. Apparatus as claimed in claim 13 further comprising a third drum having a groove in its periphery to receive the narrowed band from the second drum, stationary guides extending around the groove to restrain the band, and means for reactivating the plasticiser to set the narrowed band.

15. Apparatus as claimed in claim 14 wherein the means to reactivate the plasticiser comprises a ketone solvent.

16. Apparatus for forming a filler for a continuous cigarette filter rod comprising a first movable surface in the form of a conveyor, means for applying suction to said conveyor, means for feeding a wide band of filaments of filter material onto the surface of said conveyor at a speed greater than the speed of movement of the surface, so that the band is axially shrunk to crimp the filaments, a deflector disposed diagonally across the width of the conveyor close to the surface thereof to intercept the band and roll it to form a progressively advancing helical filler, and means to narrow the band to the desired width of the filler while retaining the crimp in the filaments produced by the axial shrinking.

17. Apparatus as claimed in claim 16 further comprising means for blanking off the portion of the conveyor beneath the deflector, and means for supplying air thereto in the opposite direction to the suction flow so as to assist in rolling the band to form the filler.

18. Apparatus for forming a filler for a continuous cigarette filter rod, comprising a first conveyor having means for applying suction thereto, means for feeding a wide band of filaments of filter material on to the first conveyor at a speed greater than the speed of movement of the first conveyor so that the band is axially shrunk to crimp the filaments, and means to narrow the band to the desired width of the filler while retaining the crimp in the filaments produced by the axial shrinking, said means to narrow the band including a second conveyor disposed diagonally across the first conveyor to collect and narrow the band, the second conveyor travelling generally in the direction of the first conveyor and also having means for applying suction thereto, and means for oscillating the second conveyor transversely to it direction of travel so that the band is laid alternatively from one side to the other of the second conveyor.

19. Apparatus as claimed in claim 18 further comprising means for blanking off a portion of the first conveyor beneath said second conveyor and means for supplying air thereto in the opposite direction to the suction flow so as to assist in transferring the band on to the second conveyor.

* * * * *